United States Patent
Choi et al.

(10) Patent No.: US 9,609,665 B2
(45) Date of Patent: Mar. 28, 2017

(54) METHOD AND APPARATUS FOR CHANNEL ACCESS IN WIRELESS LAN SYSTEM

(71) Applicant: LG Electronics Inc., Seoul (KR)

(72) Inventors: Jinsoo Choi, Anyang-si (KR); Jeongki Kim, Anyang-si (KR); Yongho Seok, Anyang-si (KR); Seunghee Han, Anyang-si (KR); Jinsam Kwak, Anyang-si (KR)

(73) Assignee: LG Electronics Inc., Seoul (KR)

( * ) Notice: Subject to any disclaimer, the term of this patent is extended or adjusted under 35 U.S.C. 154(b) by 62 days.

(21) Appl. No.: 14/387,505

(22) PCT Filed: Mar. 25, 2013

(86) PCT No.: PCT/KR2013/002445
§ 371 (c)(1),
(2) Date: Sep. 23, 2014

(87) PCT Pub. No.: WO2013/141669
PCT Pub. Date: Sep. 26, 2013

(65) Prior Publication Data
US 2015/0043558 A1   Feb. 12, 2015

Related U.S. Application Data

(60) Provisional application No. 61/614,515, filed on Mar. 23, 2012.

(51) Int. Cl.
*H04W 74/00* (2009.01)
*H04W 74/08* (2009.01)
*H04W 84/12* (2009.01)

(52) U.S. Cl.
CPC ...... *H04W 74/0808* (2013.01); *H04W 74/006* (2013.01); *H04W 84/12* (2013.01)

(58) Field of Classification Search
None
See application file for complete search history.

(56) References Cited

U.S. PATENT DOCUMENTS

2004/0186907 A1   9/2004   Wentink
2004/0253996 A1   12/2004  Chen et al.
(Continued)

FOREIGN PATENT DOCUMENTS

EP   2836045 A1   2/2015
JP   2007509532   4/2007
(Continued)

OTHER PUBLICATIONS

XP001231881; Takeuchi, S. et al: "An improved power saving mechanism for mac protocol in ad hoc networks", IEICE Trnasactions on Communications, Communications Society, Tokyo, JP, vol. E88-B, No. 7, Jul. 1, 2005, pp. 2985-2993.

(Continued)

*Primary Examiner* — Duc Duong
(74) *Attorney, Agent, or Firm* — Dentons US LLP

(57) ABSTRACT

The present invention relates to a wireless communication system, and more particularly, to a method and an apparatus for accessing a channel in a wireless LAN system. According to one embodiment of the present invention, a method for performing channel access by a station (STA) of a wireless communication system comprises: a step of receiving, from an access point (AP), information about the time window which does not allow channel access of a traffic indication map (TIM) mode STA; and a step of performing channel access based on the time window. In the event that the STA is a non-TIM mode STA, the channel access is performed in the time window. In the event that the STA is (Continued)

a TIM mode STA, the channel access is performed in the time interval indicated by the TIM, excluding the time window.

15 Claims, 18 Drawing Sheets

(56) References Cited

U.S. PATENT DOCUMENTS

| | | |
|---|---|---|
| 2005/0124313 A1 | 6/2005 | Simpson et al. |
| 2008/0220770 A1 | 9/2008 | Qi et al. |
| 2009/0016306 A1 | 1/2009 | Wang et al. |
| 2010/0284316 A1* | 11/2010 | Sampathkumar . H04W 52/0216 370/311 |
| 2013/0121221 A1* | 5/2013 | HomChaudhuri H04W 52/0206 370/311 |
| 2013/0128867 A1* | 5/2013 | Calcev ................ H04W 72/042 370/336 |
| 2013/0208637 A1* | 8/2013 | Abraham .............. H04W 52/02 370/311 |
| 2013/0229959 A1* | 9/2013 | Ghosh .................. H04W 74/08 370/311 |
| 2013/0235773 A1* | 9/2013 | Wang ................ H04W 52/0206 370/311 |
| 2016/0021680 A1* | 1/2016 | Choi .................. H04W 74/002 370/311 |

FOREIGN PATENT DOCUMENTS

| | | |
|---|---|---|
| KR | 1020040097596 | 11/2004 |
| WO | 2010095791 A1 | 8/2010 |
| WO | 2013071809 | 10/2012 |

OTHER PUBLICATIONS

Jinwoo Choi, Listen Interval for Sensor Devices, IEEE 802.11-12/0618r0, May 14, 2012.
Hyoungjin Kwon, Non-TIM Allocation, IEEE 802.11-12/0867r0, Jul. 16, 2012.
Kaiying Lv, Non-TIM Mode Negotiation, IEEE 802.11-12/1309r0, Nov. 12, 2012.

* cited by examiner

METHOD AND APPARATUS FOR CHANNEL ACCESS IN WIRELESS LAN SYSTEM

This application is a 35 USC §371 National Stage entry of International Application No. PCT/KR2013/002445 filed on Mar. 25, 2013, and claims priority to U.S. Provisional Application No. 61/614,515 filed on Mar. 23, 2012, all of which are hereby incorporated by reference in their entireties as if fully set forth herein.

TECHNICAL FIELD

The following descriptions relate to a wireless communication system and, more specifically, to a method and an apparatus for accessing a channel in a wireless LAN system.

BACKGROUND ART

With the growth of information communication technology, various wireless communication technologies are under development. Among the wireless communication technologies, wireless local area network (WLAN) technology enables wireless Internet access at home or in offices or specific service provision areas using a mobile terminal such as a personal digital assistant (PDA), a laptop computer, a portable multimedia player (PMP) or the like on the basis of radio frequency technology.

To overcome the communication rate limitations, which have been pointed out as a weak point of WLAN, recent technical standards have introduced systems with increased network rate and reliability and extended wireless network coverage. For example, IEEE 802.11n supports high throughput (HT) of a data rate of 540 Mbps or higher and introduces MIMO (Multiple Input Multiple Output) technology which uses multiple antennas for both a transmitter and a receiver in order to minimize transmission errors and optimize data rate.

DISCLOSURE

Technical Problem

M2M (Machine-to-Machine) communication technology is under discussion as next-generation communication technology. In IEEE 802.11 WLAN, IEEE 802.11ah is developed as a technical standard for supporting M2M communication. For M2M communication, a scenario in which a small amount of data is transmitted/received at a low speed occasionally in an environment having a considerably large number of devices can be considered.

Communication in a WLAN system is performed through a medium shared by all devices. When the number of devices increases as in M2M communication, channel access of one device takes a long time, deteriorating system performance and impeding power saving of devices.

An object of the present invention devised to solve the problem lies in a new channel access method for efficiently supporting operation of a device that receives data without being signaled a TIM (Traffic Indication Map).

The technical problems solved by the present invention are not limited to the above technical problems and those skilled in the art may understand other technical problems from the following description.

Technical Solution

The object of the present invention can be achieved by providing a method for performing channel access by a station (STA) of a wireless communication system, including: receiving, from an access point (AP), information about a time window in which channel access of a traffic indication map (TIM) mode STA is not allowed; and performing channel access on the basis of the time window, wherein channel access is performed in the time window when the STA corresponds to a non-TIM mode STA, and wherein channel access is performed in a time interval indicated by the TIM other than the time window when the STA corresponds to the TIM mode STA.

In another aspect of the present invention, provided herein is a method for supporting, by an AP, channel access of an STA in a wireless communication system, including: transmitting, to one or more STAs, information about a time window in which channel access of a TIM mode STA is not allowed; and operating in response to channel access of the one or more STAs on the basis of the time window, wherein channel access is performed in the time window when the STA corresponds to a non-TIM mode STA, and wherein channel access is performed in a time interval indicated by the TIM other than the time window when the STA corresponds to the TIM mode STA.

In another aspect of the present invention, provided herein is an STA performing channel access in a wireless communication system, including: a transceiver; and a processor, wherein the processor is configured to receive, from an AP, information about a time window in which channel access of a TIM mode STA is not allowed using the transceiver and to perform channel access on the basis of the time window, wherein channel access is performed in the time window when the STA corresponds to a non-TIM mode STA, and wherein channel access is performed in a time interval indicated by the TIM other than the time window when the STA corresponds to the TIM mode STA.

In another aspect of the present invention, provided herein is an AP supporting channel access of an STA in a wireless communication system, including: a transceiver; and a processor, wherein the processor is configured to transmit, to one or more STAs, information about a time window in which channel access of a TIM mode STA is not allowed using the transceiver and to operate in response to channel access of the one or more STAs on the basis of the time window, wherein channel access is performed in the time window when the STA corresponds to a non-TIM mode STA, and wherein channel access is performed in a time interval indicated by the TIM other than the time window when the STA corresponds to the TIM mode STA.

The following is commonly applicable to the aforementioned embodiments of the present invention.

The time window may be a time window in which only channel access of the non-TIM mode STA is restrictively allowed.

Information indicating that the STA corresponds to the non-TIM mode STA may be provided to the AP when the STA performs association procedure with the AP.

The time window may be periodically set.

The time window may be specified by a permission start time and a duration of a time interval of the channel access for the non-TIM mode STA.

The duration of the time interval may be determined by a specific timer.

Channel access may include power save (PS)-poll transmission of the STA.

A start point of the time window may correspond to a target wakeup time of the non-TIM mode STA.

Downlink data for the non-TIM mode STA may be buffered by the AP prior to the start point of the time window.

Downlink data for the non-TIM mode STA may be discarded by the AP after the time window expires.

The non-TIM mode STA may include a sensor type STA.

Information about the time window in which channel access of the TIM mode STA is not allowed may be provided through a beacon frame.

The above description and the following detailed description of the present invention are exemplary and are for additional explanation of the invention disclosed in the claims.

Advantageous Effects

According to the present invention, it is possible to provide a new channel access method for efficiently supporting operation of a device that receives data without being signaled a TIM (Traffic Indication Map).

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention. In the drawings.

BEST MODE

Figure 1:
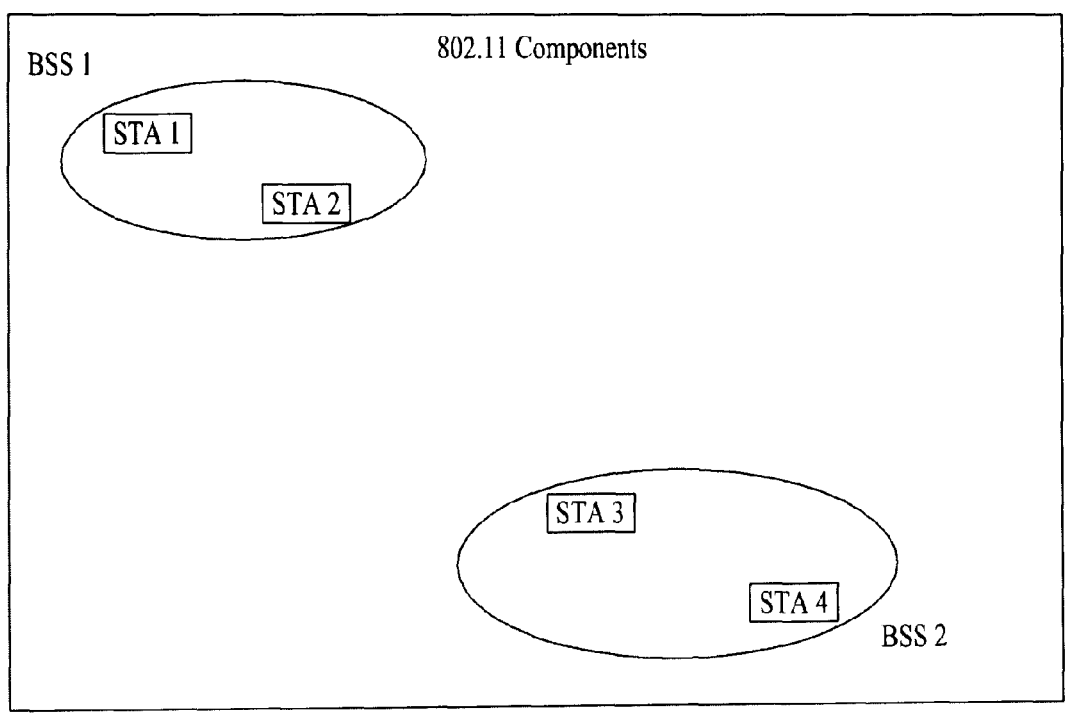
FIG. 1 illustrates an exemplary configuration of an IEEE 802.11 system to which the present invention is applicable.

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Embodiments described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

Specific terms used in the embodiments of the present invention are provided to aid in understanding of the present invention. These specific terms may be replaced with other terms within the scope and spirit of the present invention.

In some cases, to prevent the concept of the present invention from being obscured, structures and apparatuses of the known art will be omitted, or will be shown in the form of a block diagram based on main functions of each structure and apparatus. In addition, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3GPP, 3GPP LTE, LTE-A, and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. For clarity, this application focuses on the IEEE 802.11 system. However, the technical features of the present invention are not limited thereto.

Configuration of WLAN System

FIG. 1 illustrates an exemplary configuration of an IEEE 802.11 system to which the present invention is applicable.

IEEE 802.11 can be composed of a plurality of components and provide a WLAN supporting STA mobility transparent for higher layers according to interaction of the components. A basic service set (BSS) may correspond to a basic component block in an IEEE 802.11 LAN. FIG. 1 shows 2 BSSs (BSS1 and BSS2) each of which includes 2 STAs as members (STA1 and STA2 being included in BSS1 and STA3 and STA4 being included in BSS2). In FIG. 1, an oval that defines a BSS indicates a coverage area in which STAs belonging to the corresponding BSS perform communication. This area may be called a basic service area (BSA). When an STA moves out of the BSA, the STA cannot directly communicate with other STAs in the BSA.

A most basic BSS in the IEEE 802.11 LAN is an independent BSS (IBSS). For example, the IBSS can have a minimum configuration including only 2 STAs. The IBSS has a simplest form and corresponds to the BSS (BSS1 or BSS2) shown in FIG. 1, in which components other than STA are omitted. This configuration is possible when STAs can directly communicate with each other. This type of LAN can be configured as necessary rather than being previously designed and configured and may be called an ad-hoc network.

When an STA is turned on or off, or enters or exits the coverage of a BSS, membership of the STA in the BSS can be dynamically changed. To become a member of the BSS, the STA can join the BSS using a synchronization process. To access all services based on the BSS, the STA needs to associate with the BSS. Association may be dynamically set and may use a distribution system service (DSS).

Figure 2:
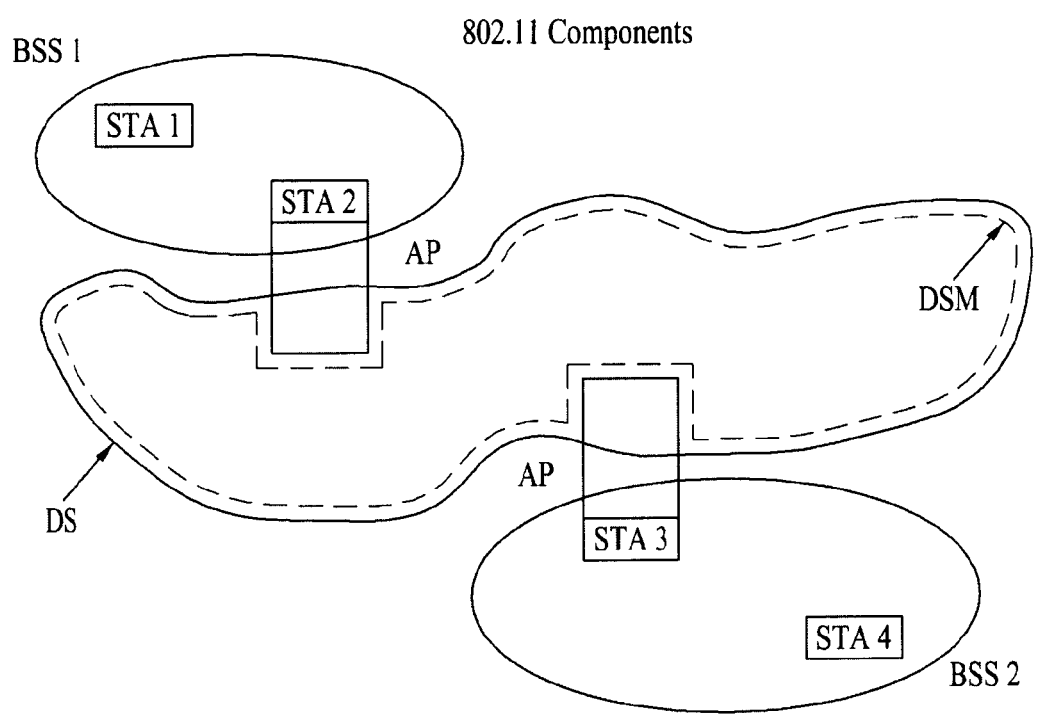
FIG. 2 illustrates another exemplary configuration of an IEEE 802.11 system to which the present invention is applicable.

FIG. 2 illustrates another exemplary configuration of an IEEE 802.11 system to which the present invention is applicable. FIG. 2 shows a distribution system (DS), a distribution system medium (DSM) and an access point (AP) in addition to the configuration of FIG. 1.

In a LAN, a direct station-to-station distance may be limited by PHY performance. While this distance limit can be sufficient in some cases, communication between stations having a long distance therebetween may be needed in some cases. The DS may be configured to support an extended coverage.

The DS refers to a structure in which BSSs are connected to each other. Specifically, BSSs may be present as components of an extended form of a network composed of a plurality of BSSs rather than being independently present as shown in FIG. 1.

The DS is a logical concept and may be specified by characteristics of the DSM. IEEE 802.11 logically discriminates a wireless medium (WM) from the DSM. The logical media are used for different purposes and used by different components. IEEE 802.11 does not limit the media as the same medium or different media. The fact that plural media are logically different from each other can explain flexibility of IEEE 802.11 LAN (DS structure or other network structures). That is, the IEEE 802.11 LAN can be implemented in various manners and physical characteristics of implementations can independently specify corresponding LAN structures.

The DS can support mobile devices by providing seamless integration of a plurality of BSSs and logical services necessary to handle addresses to a destination.

The AP refers to an entity that enables associated STAs to access the DS through a WM and has STA functionality. Data can be transmitted between a BSS and the DS through the AP. For example, STA2 and STA3 shown in FIG. 2 have STA functionality and provide a function of enabling associated STAs (STA1 and STA4) to access the DS. Furthermore, all APs are addressable entities because they basically correspond to an STA. An address used by an AP for communication on the WM is not necessarily equal to an address used by the AP for communication on the DSM.

Data transmitted from one of STAs associated with an AP to an STA address of the AP can be received at an uncontrolled port at all times and processed by an IEEE 802.1X port access entity. Furthermore, the transmitted data (or frame) can be delivered to the DS when a controlled port is authenticated.

Figure 3:
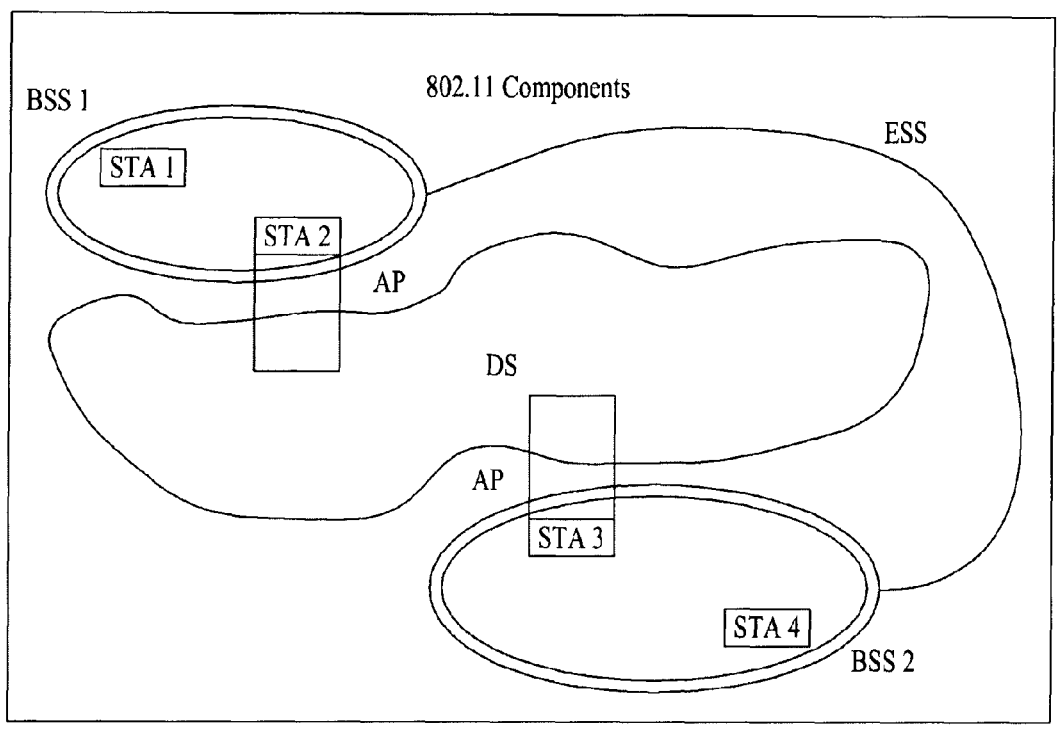
FIG. 3 illustrates another exemplary configuration of an IEEE 802.11 system to which the present invention is applicable.

FIG. 3 illustrates another exemplary configuration of an IEEE 802.11 system to which the present invention is applicable. FIG. 3 shows an extended service set (ESS) for providing an extended coverage in addition to the configuration of FIG. 2.

A wireless network having an arbitrary size and complexity may be composed of a DS and BSSs. This type of network is called an ESS network in IEEE 802.11. The ESS may correspond to a set of BSSs connected to a DS. However, the ESS does not include the DS. The ESS network looks like an IBSS network at a logical link control (LLC) layer. STAs belonging to the ESS can communicate with each other and mobile STAs can move from a BSS to another BSS (in the same ESS) transparently to LCC.

IEEE 802.11 does not define relative physical positions of BSSs in FIG. 3 and the BSSs may be located as follows. The BSSs can partially overlap, which is a structure normally used to provide continuous coverage. The BSSs may not be physically connected to each other and there is a limit on the logical distance between the BSSs. In addition, the BSSs may be physically located at the same position in order to provide redundancy. Furthermore, one (or more) IBSS or ESS networks may be physically located in the same space as one (or more ESS) network. This may correspond to an ESS network form when an ad-hoc network operates in the location of the ESS network, IEEE 802.11 networks, which physically overlap, are configured by different organizations or two or more different access and security policies are needed at the same position.

Figure 4:
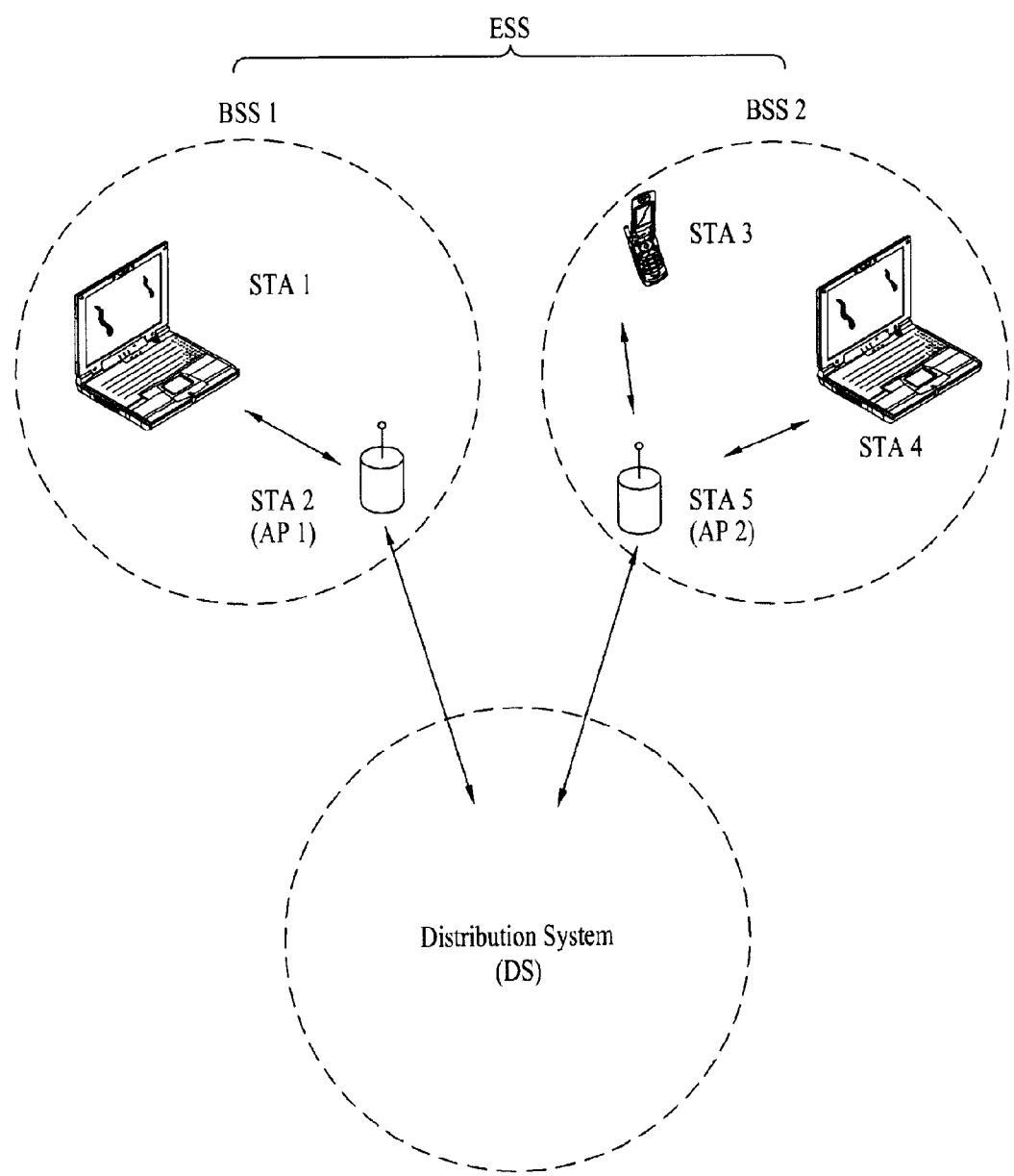
FIG. 4 illustrates an exemplary configuration of a WLAN system.

FIG. 4 illustrates an exemplary configuration of a WLAN system. FIG. 4 shows an example of a BSS based on a structure including a DS.

In the example of FIG. 4, BSS1 and BSS2 constitute an ESS. In the WLAN system, STAs are devices operating according to MAC/PHY regulations of IEEE 802.11. The STAs include an AP STA and a non-AP STA. The non-AP STA corresponds to a device directly handled by a user, such as a laptop computer, a cellular phone, etc. In the example of FIG. 4, STA1, STA3 and STA4 correspond to the non-AP STA and STA2 and STA5 correspond to the AP STA.

In the following description, the non-AP STA may be called a terminal, wireless transmit/receive unit (WTRU), user equipment (UE), mobile station (MS), motile terminal, mobile subscriber station (MSS), etc. The AP corresponds to a base station (BS), node-B, evolved node-B, base transceiver system (BTS), femto BS, etc. in other wireless communication fields.

Link Setup Procedure

Figure 5:
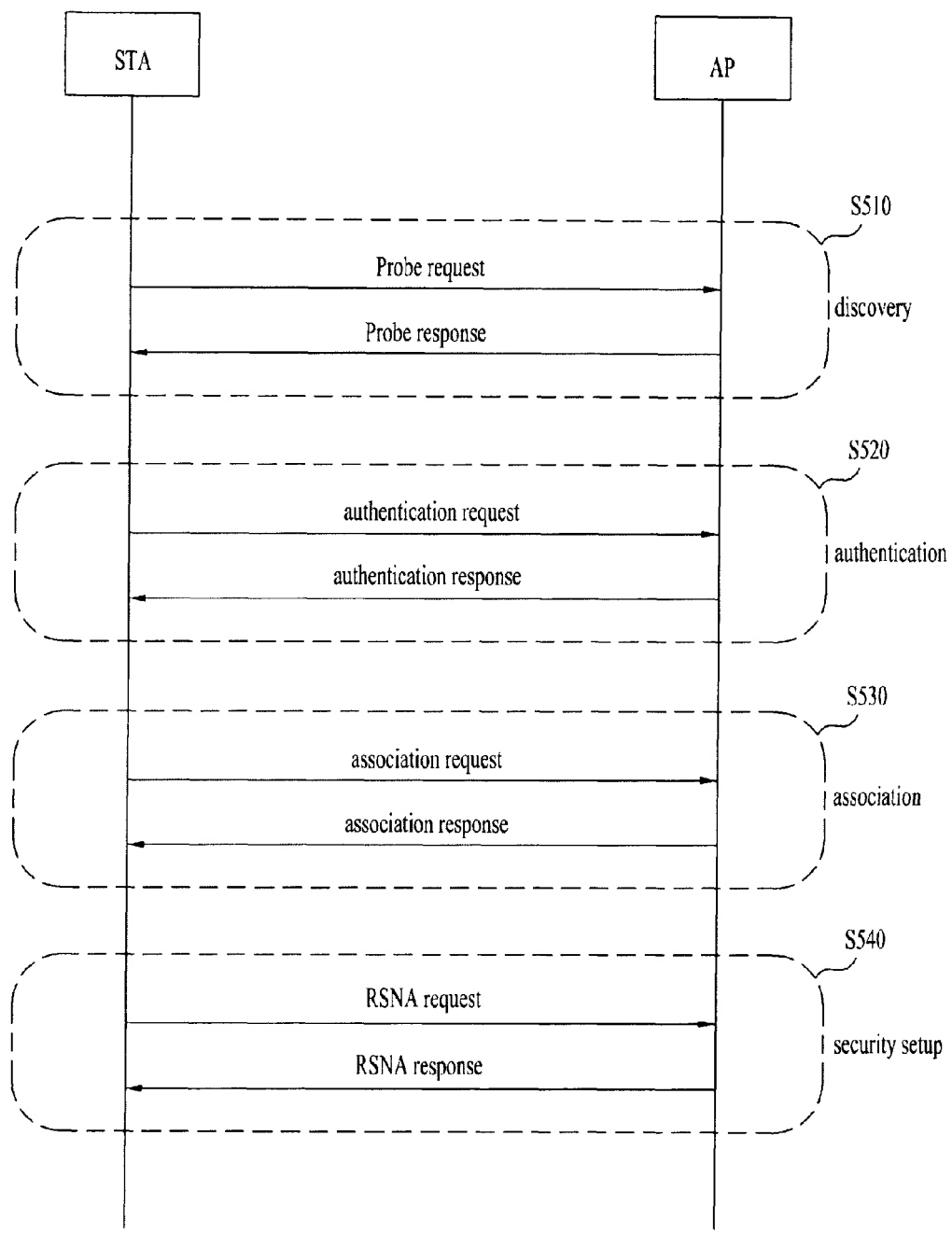
FIG. 5 illustrates a link setup procedure in a WLAN system.

FIG. 5 illustrates a general link setup procedure.

To sets up a link to a network and transmit/receive data, an STA needs to discover the network, perform authentication, establish association and pass through an authentication procedure for security. The link setup procedure may be called a session initiation procedure and a session setup procedure. In addition, discovery, authentication, association and security establishment of the link setup procedure may be called an association procedure.

An exemplary link setup procedure will now be described with reference to FIG. 5.

The STA may discover a network in step S510. Network discovery may include a scanning operation of the STA. That is, the STA needs to discover a network that can participate in communication in order to access the network. The STA needs to identify a compatible network prior to participating in a wireless network. A procedure of identifying a network present in a specific area is referred to as scanning.

Scanning includes active scanning and passive scanning.

FIG. 5 illustrates network discovery operation including active scanning. The STA performing active scanning transmits a probe request frame in order to search surrounding APs while changing channels and waits for a response to the probe request frame. A responder transmits a probe response frame in response to the probe request frame to the STA. Here, the responder may be an STA that has finally transmitted a beacon frame in a BSS of a channel being scanned. An AP corresponds to a responder in a BSS since the AP transmits a beacon frame, whereas a responder is not fixed in an IBSS since STAs in the IBSS transmit a beacon frame in rotation. For example, an STA, which has transmitted a probe request frame on channel #1 and has received a probe response frame on channel #1, may store BSS related information included in the received probe response frame, move to the next channel (e.g. channel #2) and perform scanning (i.e. probe request/response transmission and reception on channel #2) in the same manner.

The scanning operation may be performed in a passive scanning manner, which is not shown in FIG. 5. An STA performing passive scanning waits for a beacon frame while changing channels. The beacon frame, one of management frames in IEEE 802.11, indicates presence of a wireless network and is periodically transmitted to the STA performing scanning to enable the STA to discover and participate in the wireless network. An AP periodically transmits the beacon frame in the BSS, whereas STAs in the IBSS transmit the beacon frame in rotation in the case of IBSS. Upon reception of the beacon frame, the STA performing scanning stores information about the BSS, included in the beacon frame, and records beacon frame information in each channel while moving to another channel. The STA that has received the beacon frame may store BSS related information included in the received beacon frame, move to the next channel and perform scanning on the next channel through same method.

Comparing active scanning with passive scanning, active scanning has advantages of smaller delay and lower power consumption than passive scanning.

Upon discovery of the network, authentication may be performed on the STA in step S520. This authentication procedure may be referred to as first authentication to be discriminated from security setup operation of step S540, which will be described later.

Authentication includes a procedure through which the STA transmits an authentication request frame to the AP and a procedure through which the AP transmits an authentication response frame to the STA in response to the authentication request frame. An authentication frame used for authentication request/response corresponds to a management frame.

The authentication frame may include information about an authentication algorithm number, authentication transaction sequence number, status code, challenge text, RSN (Robust Security Network), finite cyclic group and the like. This information is an example of information that can be included in the authentication request/response frame and may be replaced by other information or include additional information.

The STA may transmit an authentication request frame to the AP. The AP may determine whether to permit authentication of the STA on the basis of information included in the received authentication request frame. The AP may provide an authentication processing result to the STA through an authentication response frame.

Upon successful authentication of the STA, association may be performed in step S530. Association includes a procedure through which the STA transmits an association request frame to the AP and a procedure through which the AP transmits an association response frame to the STA in response to the association request frame.

For example, the association request frame may include information related to various capabilities and information about a beacon listen interval, SSID (service set identifier), supported rates, supported channels, RSN, mobility domain, supported operating classes, traffic indication map (TIM) broadcast request, interworking service capability, etc.

For example, the association response frame may include information related to various capabilities and information about a status code, AID (association ID), supported rates, EDCA (Enhanced Distributed Channel Access) parameter set, RCPI (Received Channel Power Indicator), RSNI (Received Signal to Noise Indicator), mobility domain, timeout interval (association comeback time), overlapping BSS scan parameter, TIM broadcast response, QoS map, etc.

The aforementioned information is an example of information that can be included in the association request/response frame and may be replaced by other information or include additional information.

Upon successful association of the STA with a network, the security setup procedure may be performed in step S540. The security setup procedure S540 may correspond to authentication through RSNA (Robust Security Network Association) request/response, a first authentication procedure of the authentication procedure S520 or an authentication procedure.

The security setup procedure S540 may include a private key setup procedure through 4-way handshaking using an EAPOL (Extensible Authentication Protocol over LAN) frame. In addition, the security setup procedure may be performed according to a security scheme which is not defined in IEEE 802.11 standards.

Evolution of WLAN

IEEE 802.11n has been recently established as a technical standard for overcoming limitations on communication speed in a WLAN. IEEE 802.11n aims to increase network rate and reliability and to extend coverage of a wireless network. More specifically, IEEE 802.11n supports high throughput (HT) of data throughput of 540 Mbps or higher and is based on MIMO (Multiple Inputs and Multiple Outputs) using multiple antennas for both a transmitter and a receiver to optimize data rate while minimizing transmission error.

With propagation of WLAN and diversification of applications using the WLAN, there is a need for a new WLAN system for supporting higher throughput than data throughput supported by IEEE 802.11n. A next-generation WLAN system supporting very high throughput (VHT) corresponds to the next version (e.g. IEEE 802.11ac) of IEEE 802.11n and is one of newly suggested IEEE 802.11 WLAN systems in which a MAC service access point (SAP) supports data throughput of 1 Gbps or higher.

To efficiently use radio channels, next-generation WLAN systems support MU-MIMO (Multiple User MIMO) in which a plurality of stations (STAs) simultaneously accesses channels. According to MU-MIMO, an AP can simultaneously transmit packets to one or more MIMO-paired STAs.

Furthermore, support for WLAN operation in a whitespace is under discussion. For example, introduction of a WLAN system in a TV whitespace (TV WS) such as an idle frequency band (e.g. 54 to 698 MHz) caused by digitalization of analog TV is discussed in IEEE 802.11af. The whitespace is a band permitted to be preferentially used by a licensed user. A licensed user refers to a user permitted to use a licensed band and may be referred to as a licensed device, a primary user, an incumbent user or the like.

An AP and/or an STA operating in a WS need to provide protection of licensed users. For example, when a licensed user such as a microphone is using a specific WS channel corresponding to a frequency band having a specific bandwidth in a WS band, the AP and/or STA must not use the frequency band corresponding to the WS channel in order to protect the licensed user. In addition, when a licensed user uses a frequency band for current frame transmission and/or reception, the AP and/or STA need to stop using the frequency band.

Accordingly, the AP and/or STA need to preferentially check whether a specific frequency band in a WS band can be used, that is, whether a licensed user using the frequency band is present. Checking whether a licensed user corresponding to a specific frequency band is present is referred to as spectrum sensing. Energy detection, signature detection and the like are used as spectrum sensing mechanisms. When received signal strength exceeds a predetermined value, it may be determined that the licensed user is using the specific frequency band. Otherwise, when a DTV preamble is detected, it may be determined that the licensed user is using the frequency band.

M2M (Machine-to-Machine) communication technology is discussed as a next-generation communication technology. In IEEE 802.11 WLAN, IEEE 802.11ah is developed as a technical standard for M2M communication. M2M communication refers to a communication scheme including one or more machines and may be referred to as MTC (Machine Type Communication). Here, a machine means an entity that does not require direct manipulation or intervention of a person. For example, examples of the machine may include a device such as a meter or a vending machine equipped with a wireless communication module and user equipment such as a smartphone capable of automatically accessing a network and performing communication without user manipulation/intervention. M2M communication may include device-to-device (D2D) communication, communication between a device and an application server and the like. Examples of communication between a device and an application server may include communication between a vending machine and a server, between a point of sale (POS) device and a server and between electricity, gas or water meters and a server. In addition, M2M based applications may include security, transportation, healthcare and the like. Considering characteristics of applications of M2M communication, M2M may need to support transmission and reception of a small amount of data at a low speed occasionally in an environment in which a very large number of devices is present.

Specifically, M2M communication needs to support a large number of STAs. While it is assumed that one AP is associated with a maximum of 2007 STAs in the current WLAN system, methods for supporting a case in which a larger number of STAs (e.g. 6000 STAs) are associated with one AP are under discussion for M2M communication. Furthermore, it is expected that many applications support/require low transmission speed in M2M communication. To support this, methods for reducing a bitmap size of a traffic indication map (TIM) are discussed since an STA recognizes data to be transmitted thereto on the basis of a TIM element in a WLAN system. In addition, a large amount of traffic having very long transmission/reception intervals is expected in M2M communication. For example, in the case of electricity/gas/water metering, it is necessary to very infrequently (e.g. once a month) transmit/receive a very small amount of data. Accordingly, methods for efficiently supporting a case in which the number of STAs having data frames to be received from an AP during one beacon interval is very small even though the number of STAs that can be associated with the AP is very large are discussed in WLAN systems.

As described above, WLAN technology is rapidly evolving and technologies for establishing direct link setup, improving media streaming performance, supporting high-speed and/or large-scale initial session setup, extended bandwidths and operating frequencies, etc. are under development in addition to the aforementioned examples.

Medium Access Mechanism.

In a WLAN system conforming to IEEE 802.11, a basic access mechanism of MAC (Medium Access Control) is a CSMA/CA (Carrier Sense Multiple Access with Collision Avoidance) mechanism. The CSMA/CA mechanism is referred to as a distributed coordination function (DCF) of IEEE 802.11 MAC and basically employs a "listen before talk" access mechanism. According to this type of access mechanism, an AP and/or an STA can perform CCA (Clear Channel Assessment) for sensing a radio channel or medium for a predetermined period (e.g. DIFS (DCF Inter-Frame Space)) prior to transmission. Upon determining that the medium is in an idle state as a sensing result, the AP and/or STA starts frame transmission through the medium. Upon detecting that the medium is in an occupied state, the AP and/or STA may set a delay (e.g. a random backoff period) for medium access, wait and then attempt frame transmission rather than starting transmission. When the random backoff period is applied, multiple STAs are expected to attempt frame transmission after waiting different periods of time, and thus collision can be minimized.

The IEEE 802.11 MAC protocol provides a HCF (Hybrid Coordination Function). The HCF is based on the DCF and a PCF (Point Coordination Function). The PCF refers to a polling based synchronous access method of periodically polling all reception APs and/or STAs such that all reception APs and/or STAs can receive data frames. In addition, the HCF has EDCA (Enhanced Distributed Channel Access) and HCCA (HCF Controlled Channel Access). EDCA corresponds to a contention-based access scheme in which a provider provides data frames to a plurality of users, and HCCA uses a non-contention-based channel access scheme using a polling mechanism. Furthermore, the HCF includes a medium access mechanism for improving QoS (Quality of Service) of WLAN and can transmit QoS data in both a contention period (CP) and a contention-free period (CFP).

Figure 6:
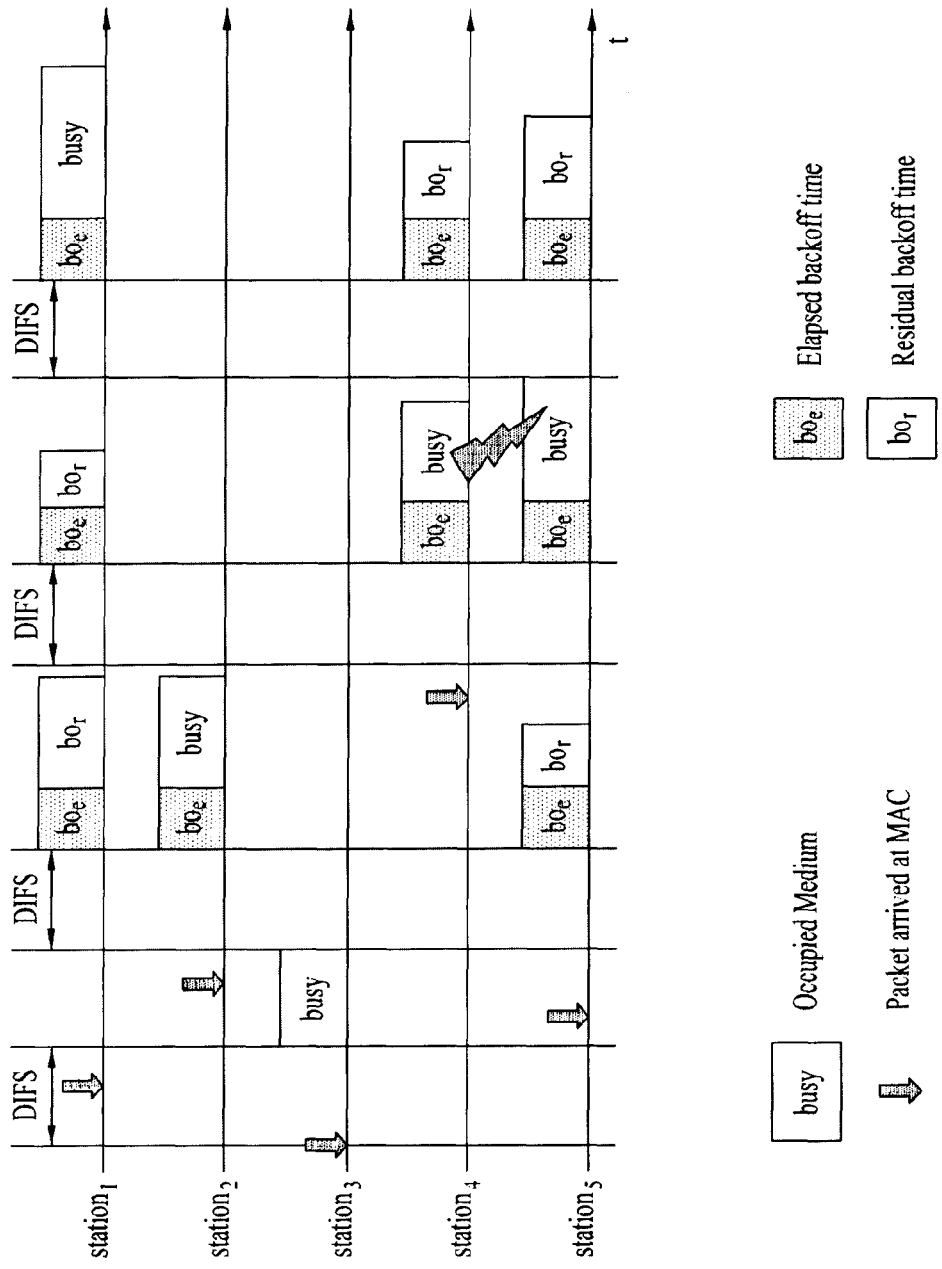
FIG. 6 illustrates a backoff procedure.

FIG. 6 illustrates a backoff procedure.

A description will be given of an operation based on a random backoff period with reference to FIG. 6. When a medium in an occupied or busy state enters an idle state, STAs may attempt data (or frame) transmission. In this case, the STAs may respectively select random backoff counts, wait slot periods corresponding to the random backoff counts, and then attempt transmission in order to minimize collision. A random backoff count has a pseudo-random integer value and may be determined as one of values in the range of 0 to CW. Here, CW is a contention window parameter. The CW parameter has an initial value CWmin and this value may be doubled in the case of transmission failure (e.g. when ACK for a transmitted frame is not received). When the CW parameter reaches CWmax, it is possible to attempt data transmission while maintaining CWmax until data transmission is successfully performed.

CWmax is reset to CWmin upon successful data transmission. CW, CWmin and CWmax are preferably set to $2^n-1$ (n=0, 1, 2, . . . ).

When a random backoff procedure is started, an STA continuously monitors the medium during backoff slot countdown according to the determined backoff count value. The STA stops countdown and waits when monitoring the medium in an occupied state and resumes remaining countdown when the medium enters an idle state.

In the example of FIG. 6, upon arrival of a packet to be transmitted at MAC of STA3, STA3 may confirm that the medium is in the idle state for DIFS and immediately transmit a frame. The remaining STAs monitor the medium in the busy state and wait. Data to be transmitted may be generated in STA1, STA2 and STA3 during monitoring and waiting. In this case, each STA can wait DIFS upon monitoring the medium in the idle state and then countdown backoff slots according to a random backoff count value selected thereby. In the example of FIG. 6, STA2 selects a smallest backoff count value and STA1 selects a largest backoff count value. That is, when STA2 finishes backoff count and starts frame transmission, residual backoff time of STA5 is shorter than residual backoff time of STA1. STA1 and STA5 stop countdown and wait while STA2 occupies the medium. When occupation of the medium of STA2 is ended and the medium becomes idle status, STA1 STA5 backoff count after waiting DIFS. That is, STA1 and STA5 can start frame transmission after countdown of residual backoff slots corresponding to residual backoff time. STA5 starts frame transmission since residual backoff time of STA5 is shorter than that of STA1. Data to be transmitted may be generated in STA4 while STA2 occupies the medium. When the medium becomes idle state, STA4 may wait DIFS, perform countdown according to the random backoff count value selected thereby and start frame transmission. FIG. 6 shows a case in which residual backoff time of STA5 is accidently consistent with the random backoff count value of STA4. In this case, STA4 and STA5 may collide. When collision occurs, both STA4 and STA5 cannot receive ACK and thus fail in data transmission. Here, STA4 and STA5 can double CW, select random backoff count values and perform countdown. STA1 may stand by during a period in which the medium is occupied due to transmission of STA4 and STA5, wait DIFS when the medium becomes idle, and then start frame transmission after residual backoff time elapses.

Sensing Operation of STA

As described above, the CSMA/CA mechanism includes virtual carrier sensing in addition to physical carrier sensing through which an AP and/or an STA directly senses a medium. Virtual carrier sensing solves a problem that may be generated in medium access, such as a hidden node problem. For virtual carrier sensing, MAC of the WLAN system can use a network allocation vector (NAV). The NAV is a value by which an AP and/or an STA, which are using a medium or have permission to use the medium, indicate a remaining time until the medium becomes available to other APs and/or STAs. Accordingly, a value set as the NAV corresponds to a period in which the medium is scheduled to be used by an AP and/or an STA transmitting a corresponding frame, and an STA receiving the NAV value is prevented from accessing the medium during the corresponding period. For example, the NAV can be set according to a value of the "duration" field of a MAC header of a frame.

To reduce the likelihood of collision, a robust collision mechanism has been introduced. The robust collision mechanism will now be described with reference to FIGS. 7 and 8. It is assumed that an actual carrier sensing range corresponds to a transmission range for convenience of description although they may not correspond to each other.

Figure 7:
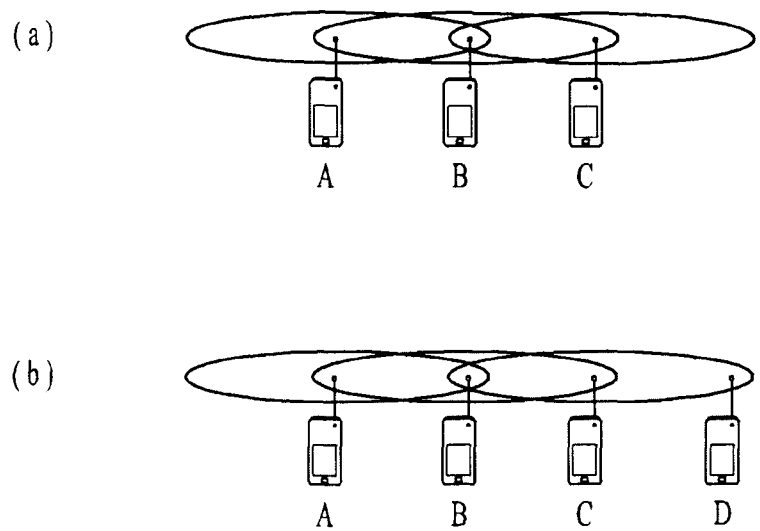
FIG. 7 illustrates a hidden node and an exposed node.

FIG. 7 illustrates a hidden node and an exposed node.

FIG. 7(b) illustrates an exemplary hidden node and shows a case in which STA A and STA B communicate with each other and STA C has information to be transmitted. Specifically, STA C may determine that a medium is idle during carrier sensing prior to transmitting data to STA B although STA A is transmitting information to STA B. This is because STA C may not sense transmission of STA A in the position of STA C. In this case, STA B simultaneously receives information of STA A and STA C and thus collision occurs. Here, STA A can be regarded as a hidden node of STA C.

FIG. 7(b) illustrates an exemplary exposed node and shows a case in which STA B transmits data to STA A and STA C has information to be transmitted to STA D. In this case, STA C may determine that the medium is occupied due to transmission of STA B using carrier sensing. Accordingly, STA C needs to wait until the medium becomes idle since the medium occupied state is sensed even when STA C has information to be transmitted to STA D. However, transmission from STA C and transmission from STA B may not collide since STA A is located outside a transmission range of STA C. Accordingly, STA C unnecessarily waits until STA B stops transmission. Here, STA C can be regarded as an exposed node of STA B.

Figure 8:
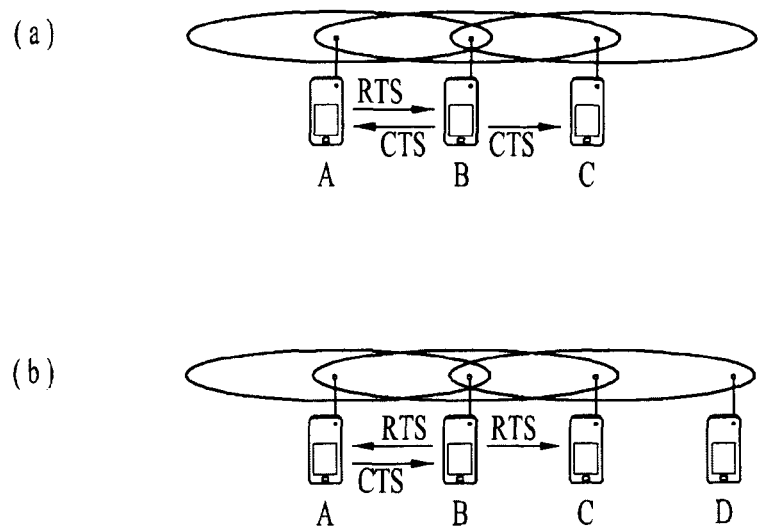
FIG. 8 illustrates RTS and CTS.

FIG. 8 illustrates RTS (Request to Send) and CTS (Clear to Send).

To efficiently use a collision avoidance mechanism in exemplary situations as shown in FIG. 7, a short signaling packet such as RTS and CTS can be used. RTS/CTS between two STAs may be used for neighboring STAs to take information transmission between the two STAs into account by overhearing the RTS/CTS. For example, when an STA intended to transmit data transmits an RTS frame to an STA that will receive the data, the STA receiving the data can notify neighboring STAs that the STA will receive the data by transmitting a CTS frame to the neighboring STAs.

FIG. 8(a) illustrates an exemplary method for solving a hidden node problem and shows a case in which both STA A and STA C attempt to transmit data to STA B. When STA A sends RTS to STA B, STA B transmits CTS to both STA A and STA C. Consequently, STA C waits until data transmission of STA A and STA B is finished and thus collision can be avoided.

FIG. 8(b) illustrates an exemplary method for solving an exposed node problem. STA C may determine that collision does not occur even when STA C transmits data to other STAs (e.g. STA D) by overhearing RTS/CTS transmission between STA A and STA B. Specifically, STA B transmits RTS to all neighboring STAs and transmits CTS only to STA A to which STA B will actually send data. STA C can recognize that STA A is located outside the carrier sensing range of STA C since STA C has received RTS but has not received CTS of STA A.

Power Management

STAs need to perform channel sensing prior to transmission/reception in a WLAN system, as described above. Continuous channel sensing causes continuous power consumption of STAs. Power consumption in a reception state is similar to power consumption in a transmission state, and thus maintenance of the reception state is a large burden on a power-restricted STA (i.e. a battery-powered STA). Accordingly, when an STA maintains a reception wait state to continuously sense channels, the STA inefficiently consumes power in terms of WLAN throughput. To solve this problem, WLAN systems support an STA power management (PM) mode.

The STA PM mode is classified into an active mode and a power save (PS) mode. STAs basically operate in the active mode. STAs operating in the active mode maintain an awake state. The awake state is a state in which normal operations such as frame transmission/reception, channel scanning and the like can be performed. An STA operating in the PS mode switches between a sleep state (or doze state) and the awake state. An STA operating in the sleep state operates with minimum power and performs neither channel scanning nor frame transmission/reception.

When an STA operates in the sleep state for a long time, power consumption decreases and thus the operation period of the STA increases. However, an STA cannot unconditionally operate in the sleep state for a long time because frame transmission and reception cannot be performed in the sleep state. When an STA operating in the sleep state has a frame to be transmitted to an AP, the STA can switch to the awake state and transmit the frame. When the AP has a frame to be transmitted to the STA, the STA in the sleep state cannot receive the frame and cannot even recognize presence of the frame to receive. Accordingly, the STA may need to switch to the awake state at a specific interval in order to recognize presence of a frame to be transmitted thereto (or to receive the frame when the frame is present).

Figure 9:
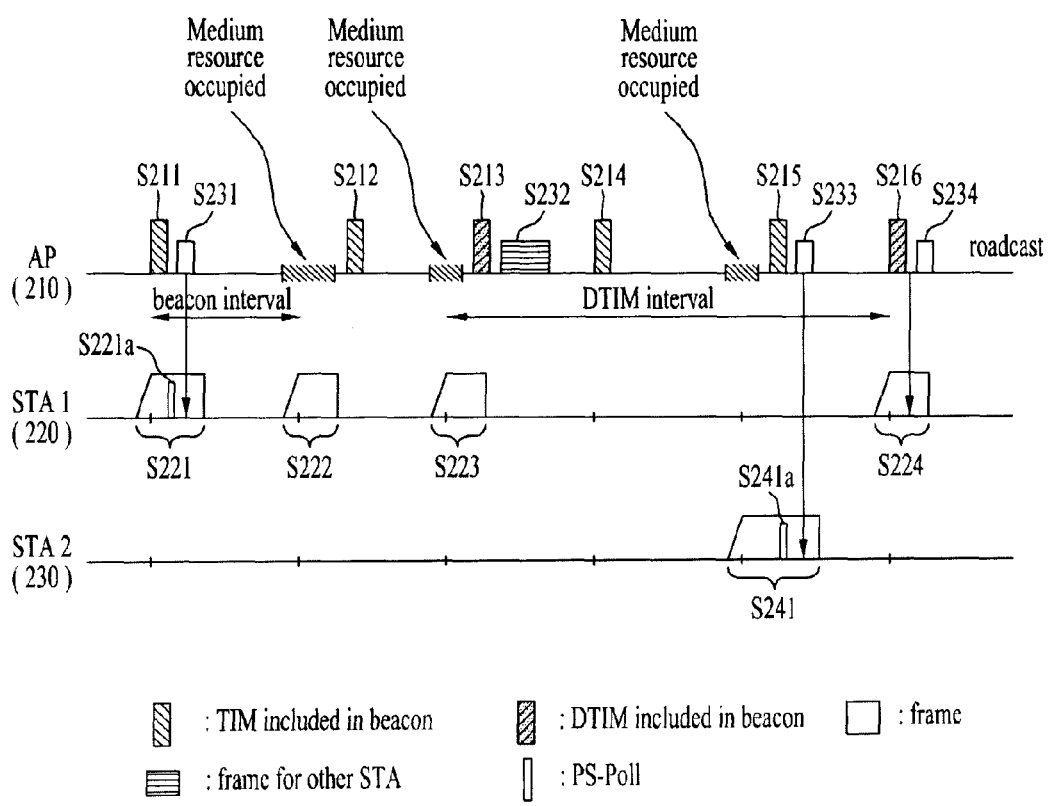
FIG. 9 illustrates power management operation.

FIG. 9 illustrates a power management operation.

Referring to FIG. 9, an AP 210 transmits a beacon frame to STAs in a BSS at a predetermined interval (S211, S212, S213, S214, S215 and S216). The beacon frame includes a TIM information element (IE). The TIM IE includes information indicating that buffered traffic for STAs associated with the AP 210 is present and the AP 210 will transmit a frame. A TIM element includes a TIM used to indicate a unicast frame and a delivery traffic indication map (DTIM) used to indicate a multicast or broadcast frame.

The AP 210 may transmit a DTIM for three beacon frame transmissions. STA1 220 and STA2 222 operate in the PS mode. STA1 220 and STA2 222 may be configured to switch from the sleep state to the awake state at a predetermined wakeup interval to receive a TIM element transmitted from the AP 210. Each STA may calculate a time to switch to the awake state on the basis of a local clock signal thereof. In the example of FIG. 9, it is assumed that an STA clock signal is consistent with an AP clock signal.

For example, the predetermined wakeup interval may be set such that STA1 220 switches to the awake state at a beacon interval to receive the TIM element. Accordingly, STA1 220 can switch to the awake state when the AP 210 initially transmits the beacon frame (S211). STA1 220 can receive the beacon frame and obtain the TIM element. When the obtained TIM element indicates presence of a frame to be transmitted to STA1 220, STA1 220 may transmit a PS-poll frame for requesting frame transmission to the AP 210 (S221a). The AP 210 may transmit a frame to STA1 220 in response to the PS-poll frame (S231). Upon completion of frame reception, STA1 220 switches to the sleep state.

In second beacon frame transmission of the AP 210, beacon frame transmission of the AP 210 may be delayed since the AP 210 may not transmit the beacon frame at a correct beacon interval due to a busy medium state in which other devices access the medium (S212). In this case, STA1 220 switches to the awake state in synchronization with the beacon interval. However, STA1 220 returns to the sleep state since it cannot receive the delayed beacon frame (S222).

When the AP 210 transmits the third beacon frame, the beacon frame may include a TIM element set to a DTIM. However, the AP 210 delays beacon frame transmission because of the busy medium state (S213). STA1 220 may switch to the awake state in synchronization with the beacon interval and obtain the DTIM through the beacon frame transmitted from the AP 210. It is assumed that the DTIM obtained by STA1 220 indicates that there is no frame to be transmitted to STA1 220 and a frame for another STA is present. In this case, STA1 220 may confirm that there is no frame to receive and return to the sleep state. The AP 210 transmits the frame to the corresponding STA after transmitting the beacon frame (S232).

The AP 210 transmits the fourth beacon frame (S214). Since STA1 220 cannot obtain information indicating that buffered traffic therefor is present through reception of the TIM element twice, STA1 220 may adjust the wakeup interval for TIM element reception. Otherwise, when the beacon frame transmitted from the AP 210 includes signaling information for adjusting the wakeup interval of STA1 220, the wakeup interval of STA1 220 can be adjusted. In the example of FIG. 9, STA1 220 may be configured to switch operation mode such that STA1 220 wakes up every three beacon intervals instead of switching operation mode per beacon interval for TIM element reception. Accordingly, after the AP 210 transmits the fourth beacon frame (S214), STA1 220 cannot obtain the corresponding TIM element since STA1 220 maintains the sleep state when the AP 210 transmits the fifth beacon frame (S215).

When the AP 210 transmits the sixth beacon frame (S216), STA1 220 may switch to the awake state and obtain the TIM element included in the beacon frame (S224). Since the TIM element is a DTIM that indicates presence of a broadcast frame, STA1 220 may receive the broadcast frame transmitted from the AP 210 without transmitting a PS-poll frame to the AP 210 (S234). In the meantime, a longer wakeup interval than that of STA1 220 may be set for STA2 230. Accordingly, STA2 230 may switch to the awake state when the AP 210 transmits the fifth beacon frame (S215) to receive the TIM element (S241). STA2 230 may recognize that a frame to be transmitted thereto is present through the TIM element and transmit a PS-poll frame to the AP 210 to request frame transmission (S241a). The AP 210 may transmit the frame to STA2 230 in response to the PS-poll frame (S233).

For management of the power save mode, as shown in FIG. 9, the TIM element includes the TIM indicating presence of a frame to be transmitted to an STA or the DTIM indicating presence of a broadcast/multicast frame. The DTIM may be implemented by setting a field of the TIM element.

Figure 10:
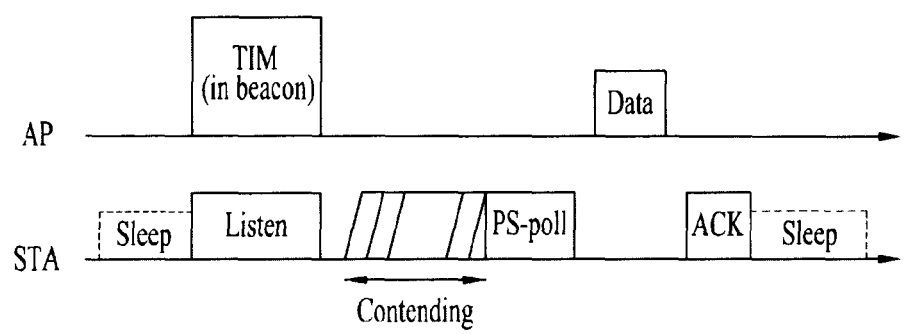
FIGS. 10 to 12 illustrate operation of an STA that has received a TIM.
Figure 11:
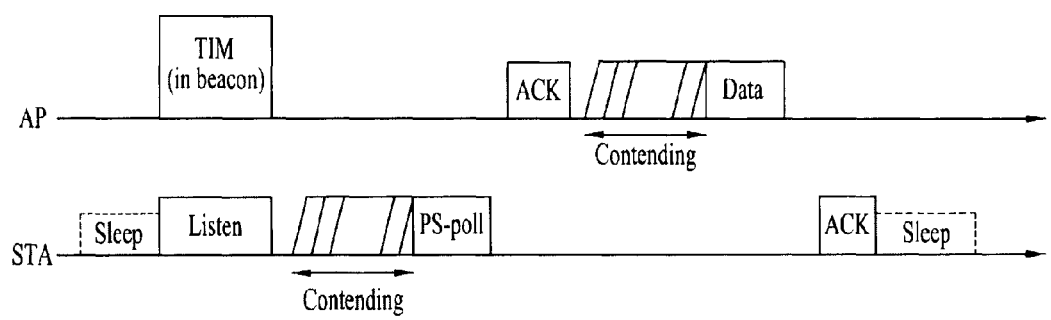
Figure 12:
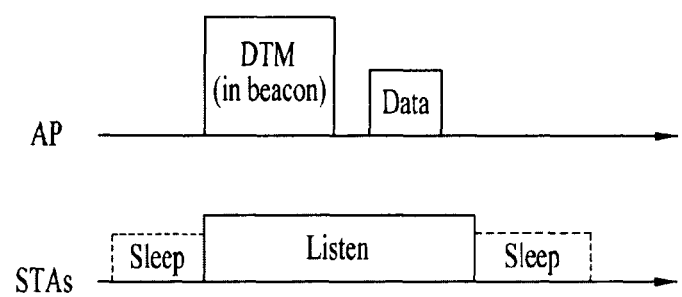

FIGS. 10 to 12 illustrate an operation of an STA receiving a TIM in detail.

Referring to FIG. 10, the STA may switch from sleep state to awake state in order to receive a beacon frame including the TIM from an AP and recognize presence of buffered traffic to be transmitted thereto by analyzing the received TIM element. The STA may transmit a PS-poll frame to the AP to request data frame transmission after contending with other STAs for medium access for PS-poll frame transmission. Upon reception of the PS-poll frame from the STA, the AP may transmit a data frame. The STA may receive the frame and transmit an ACK frame to the AP. Then, the STA may return to the sleep state.

As shown in FIG. 10, the AP may operate according to immediate response mode in which the AP transmits the data frame after the lapse of a predetermined time (e.g. short inter-frame space (SIFS)) from when the PS-poll frame is received from the STA. When the AP cannot prepare the data frame for SIFS after receiving the PS-poll frame, the AP may operate in a deferred response mode, which will now be described with reference to FIG. 11.

In the example of FIG. 11, the operation of the STA to switch from sleep state to awake state to receive a TIM from the AP and to transmit the PS-poll frame to the AP through contention is the same as the operation in the example of FIG. 10. When the AP cannot prepare the data frame for SIFS although the AP has received the PS-poll frame, the AP may transmit an ACK frame instead of the data frame to the STA. Upon preparation of the data frame after ACK frame transmission, the AP may transmit the data frame to the STA after contention. The STA may transmit an ACK frame indicating successful reception of the data frame to the AP and switch to the sleep state.

FIG. 12 illustrates an example in which the AP transmits a DTIM. STAs may switch from sleep state to awake state in order to receive a beacon frame including the DTIM from the AP. The STAs may be aware of transmission of a multicast/broadcast frame through the received DTIM. The AP may immediately transmit data (i.e. multicast/broadcast frame) without transmitting/receiving a PS-poll frame after transmitting the beacon frame including the DTIM. Upon reception of the beacon frame including the DTIM, the STAs may receive data in the awake state and return to the sleep state after completing data reception.

TIM Structure

In the method of managing the power save mode based on the TIM (DTIM) protocol, described with reference to FIGS. 9 to 12, an STA may check whether a data frame to be transmitted thereto is present through STA identification information included in the TIM element. The STA identification information may be information related to an association identifier (AID) allocated to the STA during association with the AP.

The AID is used as a unique identifier with respect to each STA in one BSS. For example, the AID can be allocated to one of values in the range of 1 to 2007 in the current WLAN system. In the current WLAN system, 14 bits may be allocated to a frame transmitted by an AP and/or an STA for the AID. While AID values may be allocated to up to 16383, 2008 to 16383 are set as reserved values.

The TIM element according to conventional definition is not appropriate for M2M applications in which a large number of (e.g. 2007 or more) STAs are associated with one AP. When the existing TIM structure is extended, a TIM bitmap size excessively increases and thus cannot be supported by existing frame formats. In addition, the extended TIM structure is not appropriate for M2M communication considering low transmission rate application. Furthermore, it is expected that the number of STAs having received data frames for one beacon interval is very small in M2M communication. Accordingly, considering application of M2M communication as described above, a technique of efficiently compressing a bitmap is needed since most bits have a value of 0 in many cases although the TIM bitmap size increases.

A method of omitting continuous 0s from the front part of a bitmap and defining the part as an offset (or start point) value has been provided as a bitmap compression technique. However, when there is a large difference between AID values of STAs while the number of STAs for which buffered frames are present is small, coding efficiency is not high. For example, when only frames to be transmitted to only two STAs respectively having AIDs of 10 and 2000 are buffered, all bits of the corresponding bitmap other than bits corresponding to both ends are 0 although the compressed bitmap has a length of 1990. While inefficiency of bitmap compression is insignificant when the number of STAs that can be associated with one AP is small, bitmap compression inefficiency may deteriorate system performance when the number of STAs increases.

To solve this, AIDs may be divided into groups and effective data transmission may be performed. A designated group ID (GID) is allocated to each group. AIDs allocated on a group basis will now be described with reference to FIG. 13.

FIG. 13(a) illustrates exemplary AIDs allocated on a group basis. In the example of FIG. 13(a), some first bits of the AID bitmap may be used to represent a GID. For example, 4 GIDs can be represented using first 2 bits of the AID bitmap. When the AID bitmap has a length of N bits, first 2 bits (B1 and B2) represent the GID of the corresponding AID.

FIG. 13(b) illustrates other exemplary AIDs allocated on a group basis. In the example of FIG. 13(b), a GID may be allocated depending on AID position. Here, AIDs using the same GID may be represented by an offset and a length. For example, when GID 1 is represented by offset A and length B, AIDs A to A+B−1 correspond to GID 1 in the bitmap. In the example of FIG. 13(b), it is assumed that 1 to N4 AIDs are divided into 4 groups. In this case, AIDs corresponding to GID 1 are 1 to N1 and may be represented by offset 1 and length N1. AIDs corresponding to GID 2 may be represented by offset N1+1 and length N2−N1+1, AIDs corresponding to GID 3 may be represented by offset N2+1 and length N3−N2+1 and AIDs corresponding to GID 4 may be represented by offset N3+1 and length N4−N3+1.

AIDs allocated on a group basis permit channel access in different intervals according to GID to solve TIM element shortages for a large number of STAs and achieve efficient data transmission and reception. For example, channel access can be permitted for only STAs corresponding to a specific group and restricted for other STAs in a specific interval. A predetermined interval in which channel access is permitted for only specific STAs may be referred to as a restricted access window (RAW).

Channel access according to GID will now be described with reference to FIG. 13(c). FIG. 13(c) illustrates a channel access mechanism according to beacon interval when AIDs are divided into 3 groups. In the first beacon interval (or first RAW), channel access of STAs corresponding to AIDs belonging to GID 1 is permitted and channel access of STAs corresponding to other GIDs is not permitted. To implement this, the first beacon includes a TIM element only for AIDs corresponding to GID 1. The second beacon includes a TIM element only for AIDs corresponding to GID 2 and thus only channel access of STAs corresponding to AIDs belonging to GID 2 is permitted in the second beacon interval (or second RAW). The third beacon includes a TIM element only for AIDs corresponding to GID 3 and thus only channel access of STAs corresponding to AIDs belonging to GID 3 is permitted in the third beacon interval (or third RAW). The fourth beacon includes the TIM element only for the AIDs corresponding to GID 1 and thus only channel access of the STAs corresponding to the AIDs belonging to GID 1 is permitted in the fourth beacon interval (or fourth RAW). In the fifth and following beacon intervals (or fifth and following RAWs), only channel access of STAs belonging to specific groups indicated by TIMs included in the corresponding beacon frames is permitted.

While FIG. 13(c) illustrates GIDs in circular or periodic order according to beacon interval, the present invention is not limited thereto. That is, only AIDs corresponding to a specific GID may be included in a TIM element such that channel access of only STAs corresponding to the AIDs is permitted in a specific interval (e.g. specific RAW) and channel access of other STAs is restricted.

Figure 13:
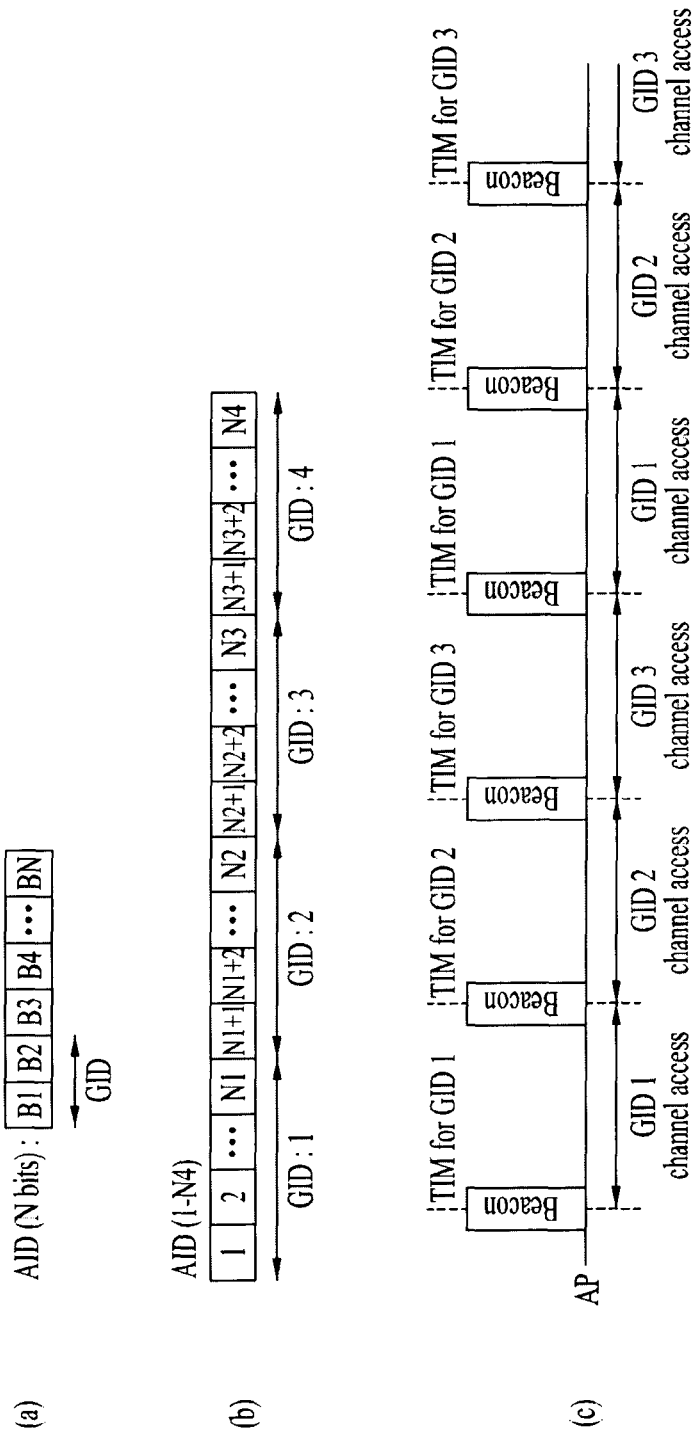
FIG. 13 illustrates group based AID.

The aforementioned group-based AID allocation scheme may be referred to as a hierarchical TIM structure. That is, all AIDs may be divided into a plurality of blocks and channel access of only STAs (i.e. STAs in a specific group) corresponding to a specific block having a non-zero value may be permitted. Accordingly, a large TIM is divided into small blocks/groups to allow STAs to easily maintain TIM information and to easily manage blocks/groups according to class, QoS or purpose of STA. While FIG. 13 illustrates a 2-level layer, a hierarchical TIM may be configured at two or more levels. For example, it is possible to divide all AIDs into a plurality of page groups, divide each page group into a plurality of blocks and divide each block into a plurality of sub-blocks. In this case, first N1 bits in an AID bitmap can represent a page ID (i.e. PID), the next N2 bits can represent a block ID, the next N3 bits can represent a sub-block ID and the remaining bits can represent an STA bit position in the corresponding sub-block, as an extension of the example of FIG. 13(a).

In embodiments of the present invention, which will be described below, various methods for dividing STAs (or AIDs respectively allocated to the STAs) into predetermined hierarchical groups and managing the divided STAs are applicable and group based AID allocation is not limited to the aforementioned examples.

Enhanced Channel Access Scheme

The present invention suggests a method for efficiently supporting an STA that receives data from an AP without TIM signaling so as to improve channel access operation of the STA in a WLAN system.

Figure 14:
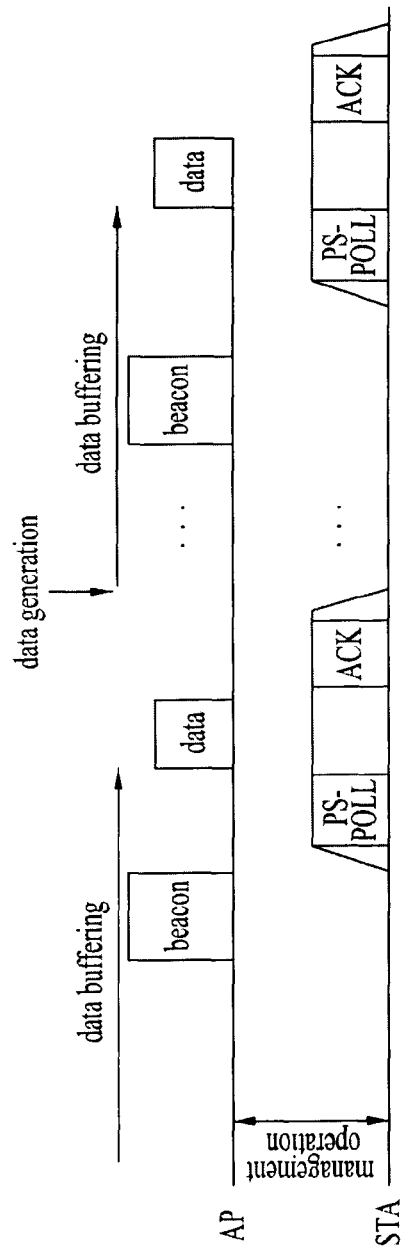
FIG. 14 illustrates a channel access mechanism of a non-TIM STA.

FIG. 14 illustrates a channel access mechanism of a non-TIM STA.

As shown in FIG. 14, the STA may signal presence thereof to an AP through a management operation such as association or negotiation and notify the AP of preference with respect to downlink transmission. For example, indication and confirmation of this information may be performed through association request/response procedures, probe request/response procedures or the like between the STA and the AP.

Preference of the STA with respect to downlink transmission may include one of a method of recognizing presence or absence of downlink data through a TIM and receiving the downlink data according to a recognition result and a method of receiving downlink data without using the TIM. For example, it is assumed that a meter or sensor type STA (referred to as S-STA in the specification) operates in such a manner that the S-STA remains in a sleep mode for a long time at a fixed interval (e.g. one month) and then wakes up for a short time according to characteristics of an application (e.g. gas metering report) to perform channel access in order to minimize power consumption.

The AP provides TIM information to the STA in order to improve resource utilization efficiency by allowing the STA to perform channel access only in a time resource indicated by the TIM. However, since downlink data for the aforementioned S-STA is present only for a very short time, signaling overhead for transmission of TIM information to the S-STA from the AP through each beacon may cause inefficiency of network resource utilization. Accordingly, for the S-STA, there is no need to signal data buffering state to the AP for TIM signaling overhead. A mode in which an STA operates without indication by a TM may be referred to as a non-TIM mode and a mode in which the STA operates with indication by the TIM may be referred to as a TIM mode.

As shown in FIG. 14, the AP stores downlink data to be transmitted to the non-TIM STA until PS-poll is received from the non-TIM STA. The non-TIM STA can transmit the PS-poll to the AP at an arbitrary time since the non-TIM STA can transmit the PS-poll without being restricted by the TIM. Upon reception of the PS-poll from the non-TIM STA, the AP may transmit the stored downlink data for the non-TIM STA to the non-TIM STA and receive an ACK frame from the non-TIM STA.

Since the AP cannot be aware of the time when the S-STA (or non-TIM STA) will transmit the PS-poll, the AP needs to prepare and store the downlink data in a period from when preference information (e.g. information indicating that PS-poll operation will be performed without TIM signaling) about TIM signaling is received during negotiation/association with the S-STA or when the downlink data for the S-STA is generated to when the downlink data is transmitted to the S-STA. Although the amount of data per S-STA is small, buffering and/or management of data for all S-STAs may be a large burden on the system or AP when the number of S-STAs accessing channels is large according to various types and periods.

Accordingly, the present invention suggests a new channel access method (specifically, a new PS-poll mechanism) for the S-STAs (or non-TIM STA) in order to overcome the aforementioned inefficiency.

Embodiment 1

The present embodiment provides a method by which a PS-poll transmission timing and/or transmission interval of an S-STA (or non-TIM STA) and an AP manages downlink data on the basis of the transmission timing and/or transmission interval. Accordingly, the AP need not maintain data of S-STAs for a long time and thus buffer/memory resources of the AP can be used more efficiently.

Figure 15:
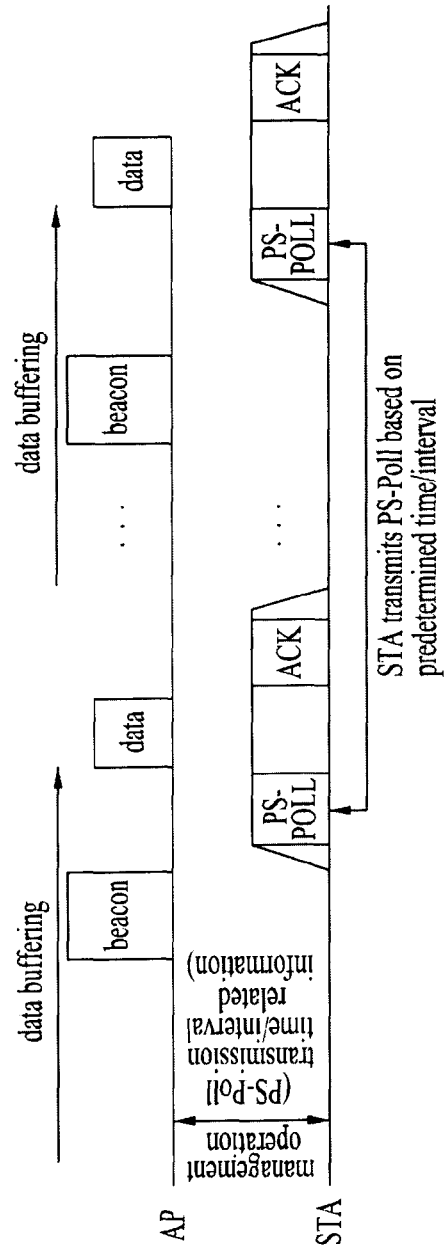
FIG. 15 illustrates an enhanced channel access mechanism according to an embodiment of the present invention.

FIG. 15 illustrates an enhanced channel access mechanism according to an embodiment of the present invention.

Referring to FIG. 15, an S-STA (or non-TIM STA) may negotiate with an AP for preference with respect to PS-poll transmission based on TIM signaling through a management procedure (e.g. association request/response procedure, probe request/response procedure and the like) with the AP. Here, the S-STA may negotiate with the AP for at least one of PS-poll transmission timing and transmission interval while notifying the AP that the S-STA will operate in a mode that is not based on a TIM (i.e. non-TIM mode). That is, the S-STA may exchange information about the PS-poll transmission timing and/or transmission interval with the AP through a specific management frame.

The information about the PS-poll transmission timing and/or transmission interval may be determined by the S-STA on the basis of application characteristics thereof (e.g. a reporting rate and a channel access rate) and signaled to the AP. Otherwise, the AP may determine the information about the PS-poll transmission timing and/or transmission interval on the basis of network load and status (e.g. network access, software update interval, etc.) and signal the information to the S-STA.

In addition, information about the PS-poll transmission timing and/or transmission interval, signaled by one of the S-STA and the AP to the other, may be corrected (or updated) by the other and then returned. For example, when the S-STA determines the information about the PS-poll transmission timing and/or transmission interval and transmits the information to the AP through a predetermined request frame, the AP may generate corrected information in consideration of network load and the like and signal the corrected information to the S-STA through a predetermined response frame. Otherwise, when the AP determines the information about the PS-poll transmission timing and/or transmission interval and transmits the information to the S-STA through a predetermined request frame, the S-STA may generate corrected information in consideration of application characteristics thereof and the like and signal the corrected information to the AP through a predetermined response frame.

When a PS-poll transmittable timing and/or transmission interval are predetermined between the AP and the S-STA, as described above, the S-STA may transmit PS-poll to the AP on the basis of the PS-poll transmission timing and/or transmission interval. Here, since the S-STA needs to undergo contention for a medium in order to transmit the PS-poll, it should be understood that the S-STA attempts transmission at the corresponding timing. That is, PS-poll transmission/reception may not be performed at/in the predetermined transmission timing/interval. Description will be given of operations of an AP and an S-STA when a PS-poll transmittable (or transmission allowable) timing/interval is predetermined.

The AP may prepare data prior to a predetermined PS-poll transmittable timing of the STA (e.g. S-STA or non-TIM STA) and transmit the prepared data to the STA upon successful reception of PS-poll from the STA. Here, since the AP may not receive the PS-poll accurately at the transmittable timing due to medium contention for PS-poll transmission, the AP may prepare the data with a margin. In addition, a time in which the AP prepares the data may include a time in which the AP receives the data to be transmitted to the STA from a server and buffers the data. If the AP cannot immediately transmit the data to the STA due to lack of data preparation time although the PS-poll has been received from the STA, the AP may transmit an ACK frame for the PS-poll to the STA first and then transmit the data to the STA through contention (refer to FIG. 11). According to the present invention, the AP can prepare and buffer the data before a predetermined specific timing instead of continuously buffering the data from association/negotiation with the STA, and thus burden on the AP is reduced.

The STA (e.g. S-STA or non-TIM STA) may transmit the PS-poll to the AP through contention at the predetermined PS-poll transmittable timing/interval. Since the S-STA is in sleep (or doze) mode in a long interval in many cases, the S-STA may be configured to wake up at the predetermined PS-poll transmittable timing/interval and to transmit the PS-poll to the AP through contention. In view of this, the PS-poll transmittable timing of the STA may correspond to a target wake time of the STA.

As described above, even when the STA wakes up at predetermined time and attempts PS-poll transmission, the STA may continuously fail to transmit the PS-poll when the medium is continuously occupied by another STA. Particularly, when the STA transmits the PS-poll without being based on the TIM, the possibility that another STA occupies the medium at the corresponding time cannot be eliminated even when the STA operates at the predetermined PS-poll transmittable time. Accordingly, if PS-poll transmission of the STA fails after multiple attempts, then unrestricted PS-poll transmission attempt may cause excessive power consumption of the STA.

To solve this problem, the present invention suggests definition and utilization of a specific timer (e.g. a PS-poll transmittable timer or a channel access permission timer) related to PS-poll transmission or channel access of an STA (e.g. S-STA or non-TIM STA). The specific timer may be defined to operate in an interval from the aforementioned PS-poll transmittable time to a predetermined boundary. During operation of the specific timer, the STA may attempt PS-poll transmission and the AP may expect PS-poll transmission from the STA. That is, PS-poll transmission time is not fixed and a time window (or interval) in which the STA is permitted to transmit PS-poll (i.e. to access a channel) is defined (or restricted). Accordingly, the STA can perform contention-based PS-poll transmission at the PS-poll transmittable time and the interval defined by the timer.

The timer may be set for both the AP and the STA.

In addition, the STA may enter a doze state upon expiration of the timer starting at predetermined PS-poll transmission time and wake up at the next PS-poll transmittable time (or the next transmittable time determined based on a PS-poll transmission interval) to attempt PS-poll transmission during the interval.

The AP may prepare and buffer data for the STA at the predetermined PS-poll transmission time (or prior thereto) and discard the buffered data upon expiration of the timer starting at the PS-poll transmission time.

When the wakeup interval of the STA is very long, the STA may operate in the doze mode for a long time without listening for a beacon from the AP, and thus timing synchronization between the AP and STA may not be acquired due to clock drift or the like. In this case, while the STA transmits PS-poll to the AP upon determining that PS-poll transmission thereof is permitted, the STA may not successfully receive data since the AP has discarded the data upon expiration of the corresponding time window. That is, when the PS-poll transmission permission time window of the STA is strictly applied, channel access or data transmission and reception of the STA may not be correctly performed. Accordingly, even when the timer that defines the PS-poll transmittable time window expires, PS-poll transmission of the STA may be permitted at an arbitrary time. In addition, when the wakeup interval of the STA is very long, the AP may maintain the data for the STA without discarding the same since PS-poll transmission of the STA may be performed even when the timer expires. However, the method of permitting PS-poll transmission of the STA even after expiration of the timer may be understood as a method separate from the method of setting the PS-poll transmission time (or wakeup time) and the PS-poll transmission (or channel access) permission time window of the STA, defined (or restricted) according to the specific timer or as an exceptional method.

The AP and the STA may predetermine the length of the aforementioned PS-poll transmission (or channel access) permission time window or the timer through management operation such as a negotiation/association procedure.

Embodiment 2

The present embodiment suggests a method for separately setting a channel access (or PS-poll transmission) permission time window of an S-STA (or non-TIM STA) and a channel access (or PS-poll transmission) permission time window of an STA (or TIM STA) of a different type. Accordingly, channel access such as PS-poll transmission/reception of the S-STA (or non-TIM STA) can be ensured.

Figure 16:
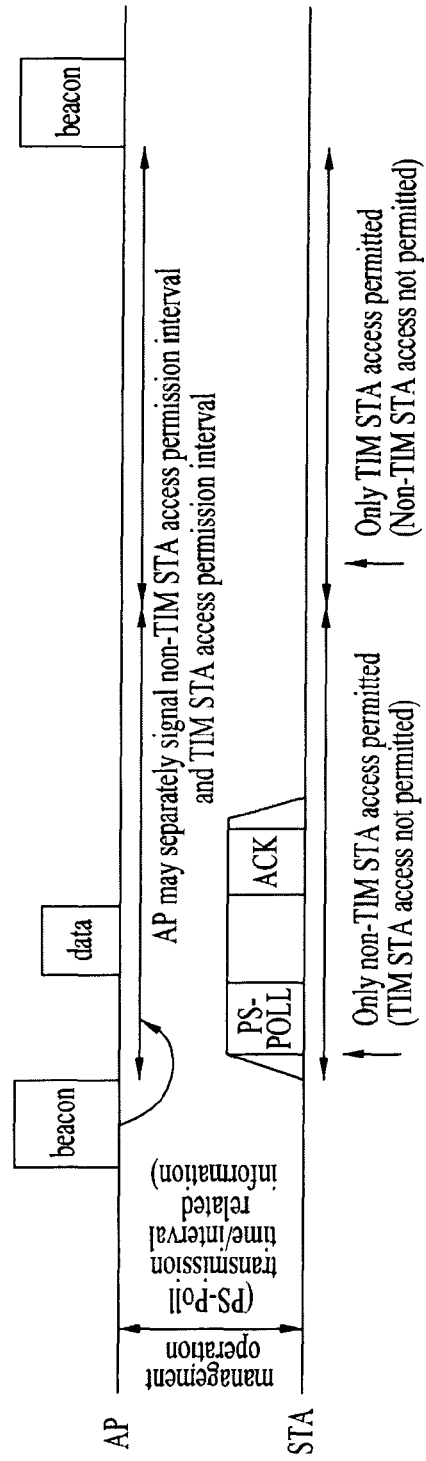
FIG. 16 illustrates an enhanced channel access mechanism according to another embodiment of the present invention.

FIG. 16 illustrates an enhanced channel access mechanism according to another embodiment of the present invention.

As shown in FIG. 16, when a specific beacon interval (a time window between two consecutive beacons) includes a PS-poll transmission (or channel access) permission time of an S-STA (or non-TIM STA), an AP may transmit, to STAs, a beacon signal including information about separate setting of a PS-poll transmission (or channel access) permission time window of the S-STA (or non-TIM STA) and a PS-poll transmission (or channel access) permission time window of an STA (or TIM STA) of a different type. Additionally or alternatively, the AP may signal, to the STAs, information about separate setting of time windows, which represents that a specific time window within each beacon interval is limited to a PS-poll transmission (or channel access) permission interval of the S-STA (or non-TIM STA) and another time window is limited to a PS-poll transmission (or channel access) permission interval of the STA (or TIM STA) of the different type, during management operation using association request/response, negotiation request/response and probe request/response frames with respect to the STAs.

Here, separate setting of time windows refers to setting of time windows such that the S-STA (or non-TIM STA) and an STA of a different type (or TIM STA) are not permitted to access channels within the same time window. In other words, only the S-STA (or non-TIM STA) can perform channel access and the STA of the different type (or TIM STA) cannot perform channel access in a specific time window, whereas only the STA of the different type (or TIM STA) can perform channel access and the S-STA (or non-TIM STA) cannot perform channel access in another time window.

The information about separate setting of time windows may include one or more of a method of informing the TIM STA of a time window in which channel access is not permitted, a method of informing the TIM STA of a time window in which channel access is permitted, a method of informing the non-TIM STA of a time window in which channel access is not permitted, and a method of informing the non-TIM STA of a time window in which channel access is permitted When a time window in which channel access is permitted for a first type STA (e.g. S-STA or non-TIM STA) and is not permitted for a second type STA (e.g. STA other than S-STA or TIM STA) is set, the AP may provide timing and period (or interval) information of the time window to a specific STA and signal whether PS-poll (or channel access) of the specific STA is permitted only within the time window set based on the timing and period. For example, the AP can notify the second type STAs that channel access is not permitted in a time window for the first type STA (or channel access is permitted in time windows other than the time window for the first type STA in a specific beacon interval) through management operation such as a negotiation/association procedure.

Signaling of timing at which channel access (or PS-poll transmission) is permitted only for an STA of a specific type, timer (or length of an interval) and/or position of a specific time window, suggested by the present invention as described above, may be predetermined through management operation such as negotiation/association between the AP and STAs.

Figure 17:
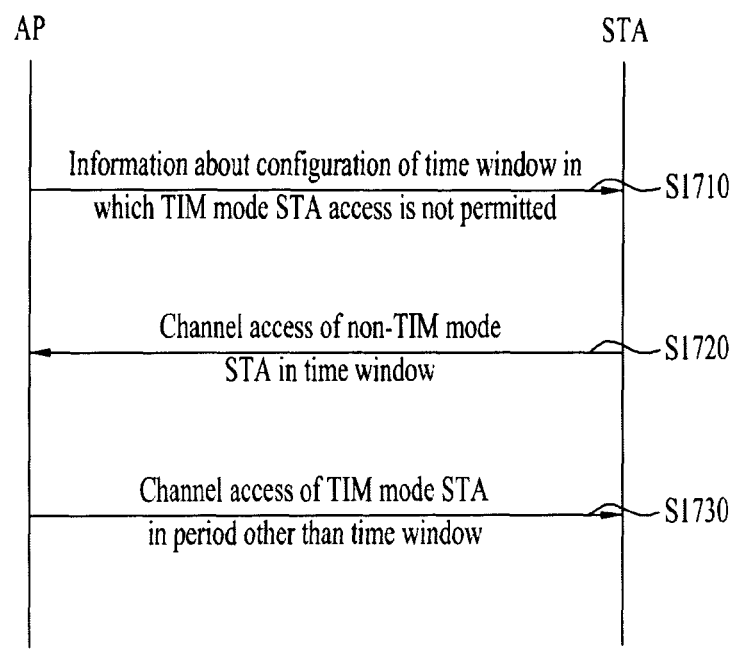
FIG. 17 illustrates a channel access method according to an embodiment of the present invention.

FIG. 17 illustrates a channel access method according to an embodiment of the present invention.

An AP may provide, to one or more STAs, information about configuration of a time window in which access of a TIM STA is not permitted (or a time window in which only access of a non-TIM STA is permitted) in step S1710. The time window may be periodically set. In addition, the time window may be specified by the start point and the interval (or timer).

A non-TIM STA from among the one or more STAs may perform channel access (e.g. PS-poll transmission) within the time window in step S1720. For example, when the non-TIM STA operates at a long sleep interval like an S-STA, the non-TIM STA can wake up at the start point of the time window and perform channel access. Accordingly, the time window may be regarded as a window in which only access of the non-TIM STA is restrictively permitted. The AP may buffer data for the non-TIM STA prior to the time window for channel access of the non-TIM STA and discard the data upon expiration of the time window.

A TIM STA from among the one or more STAs may perform channel access in an interval indicated by a TIM therefor in a period other than the time window in step S1730.

In the channel access method illustrated in FIG. 17, the aforementioned various embodiments of the present invention may be independently applied or two or more thereof may be simultaneously applied.

Figure 18:
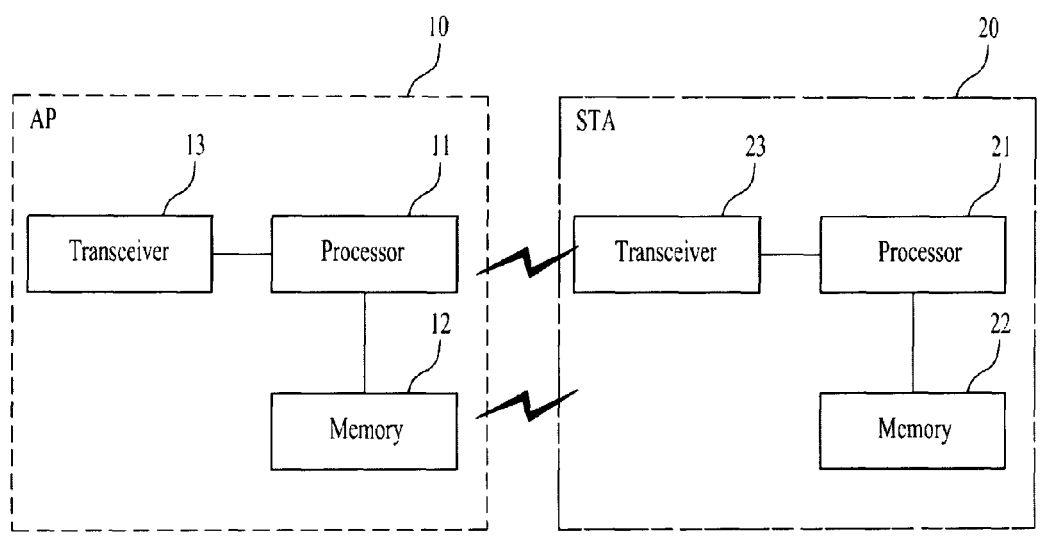
FIG. 18 illustrates a configuration of an RF device according to an embodiment of the present invention.

FIG. 18 is a block diagram illustrating a configuration of an RF device according to an embodiment of the present invention.

An AP 10 may include a processor 11, a memory 12 and a transceiver 13. An STA 20 may include a processor 21, a memory 22 and a transceiver 23. The transceivers 13 and 23 may transmit/receive RF signals and implement a physical layer according to IEEE 802 standards, for example. The processors 11 and 21 may be connected to the transceivers 13 and 23 and implement a physical layer and/or MAC layer according to IEEE 802 standards. The processor may be configured to perform operations according to the aforementioned embodiments of the present invention. Modules for implementing operations of the AP and the STA according to the aforementioned embodiments of the present invention may be stored in the memories 12 and 22 and executed by the processors 11 and 21. The memories 12 and 22 may be included in the processors 11 and 21 or provided to the outside of the processors 11 and 21 and connected to the processors 11 and 21 through known means.

Detailed configurations of the AP and the STA may be implemented such that the aforementioned various embodiments of the present invention may be independently applied or two or more thereof may be simultaneously applied and description of redundant parts is omitted for clarity.

The embodiments of the present invention may be implemented by various means, for example, hardware, firmware, software, or combinations thereof.

When the embodiments of the present invention are implemented using hardware, the embodiments may be implemented using at least one of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

While the above-described embodiments of the present invention focus on IEEE 802.11, they are applicable to various mobile communication systems in the same manner.

The invention claimed is:

1. A method for performing channel access by a station (STA) of a wireless communication system, comprising:
   receiving, from an access point (AP), information about a time window in which channel access of a traffic indication map (TIM) mode STA is not allowed; and
   performing channel access on the basis of the time window,
   wherein channel access is performed in the time window when the STA corresponds to a non-TIM mode STA, and
   wherein channel access is performed in a time interval indicated by the TIM other than the time window when the STA corresponds to the TIM mode STA.

2. The method according to claim 1, wherein the time window is a time window in which only channel access of the non-TIM mode STA is restrictively allowed.

3. The method according to claim 1, wherein information indicating that the STA corresponds to the non-TIM mode STA is provided to the AP when the STA performs association procedure with the AP.

4. The method according to claim 1, wherein the time window is periodically set.

5. The method according to claim 1, wherein the time window is specified by a permission start time and a duration of a time interval of the channel access for the non-TIM mode STA.

6. The method according to claim 5, wherein the duration of the time interval is determined by a specific timer.

7. The method according to claim 1, wherein the channel access includes power save (PS)-poll transmission of the STA.

8. The method according to claim 1, wherein a start point of the time window corresponds to a target wakeup time of the non-TIM mode STA.

9. The method according to claim 1, wherein downlink data for the non-TIM mode STA is buffered by the AP prior to the start point of the time window.

10. The method according to claim 9, wherein downlink data for the non-TIM mode STA is discarded by the AP after the time window expires.

11. The method according to claim 1, wherein the non-TIM mode STA includes a sensor type STA.

12. The method according to claim 1, wherein information about the time window in which channel access of the TIM mode STA is not allowed is provided through a beacon frame.

13. A method for supporting, by an AP, channel access of an STA in a wireless communication system, the method comprising:
   transmitting, to one or more STAs, information about a time window in which channel access of a TIM mode STA is not allowed; and
   operating in response to channel access of the one or more STAs on the basis of the time window,
   wherein channel access is performed in the time window when the STA corresponds to a non-TIM mode STA, and
   wherein channel access is performed in a time interval indicated by the TIM other than the time window when the STA corresponds to the TIM mode STA.

14. An STA performing channel access in a wireless communication system, comprising:
   a transceiver;
   and a processor that:
      controls the transceiver to receive, from an AP, information about a time window in which channel access of a TIM mode STA is not allowed, and
      performs channel access on the basis of the time window,
   wherein channel access is performed in the time window when the STA corresponds to a non-TIM mode STA, and
   wherein channel access is performed in a time interval indicated by the TIM other than the time window when the STA corresponds to the TIM mode STA.

15. An AP supporting channel access of an STA in a wireless communication system, comprising:
   a transceiver; and
   a processor that:
      controls the transceiver to transmit, to one or more STAs, information about a time window in which channel access of a TIM mode STA is not allowed, and
      operates in response to channel access of the one or more STAs on the basis of the time window,
   wherein channel access is performed in the time window when the STA corresponds to a non-TIM mode STA, and
   wherein channel access is performed in a time interval indicated by the TIM other than the time window when the STA corresponds to the TIM mode STA.

* * * * *